United States Patent
Berger

(10) Patent No.: US 8,137,004 B2
(45) Date of Patent: Mar. 20, 2012

(54) AIR-COOLED PLUG PART FOR AN OPTICAL WAVEGUIDE

(76) Inventor: Roland Berger, Buchendorf/Gauting (DE)

(*) Notice: Subject to any disclaimer, the term of this patent is extended or adjusted under 35 U.S.C. 154(b) by 611 days.

(21) Appl. No.: 12/374,112

(22) PCT Filed: Jul. 11, 2007

(86) PCT No.: PCT/DE2007/001291
§ 371 (c)(1),
(2), (4) Date: Jan. 16, 2009

(87) PCT Pub. No.: WO2008/011868
PCT Pub. Date: Jan. 31, 2008

(65) Prior Publication Data
US 2009/0304336 A1     Dec. 10, 2009

(30) Foreign Application Priority Data
Jul. 22, 2006 (DE) .......................... 10 2006 034 031

(51) Int. Cl.
G02B 6/36 (2006.01)
G02B 6/00 (2006.01)
(52) U.S. Cl. ............... 385/94; 385/88; 385/92; 385/139
(58) Field of Classification Search .................... 385/88, 385/92, 94, 139
See application file for complete search history.

(56) References Cited

U.S. PATENT DOCUMENTS

| | | | |
|---|---|---|---|
| 4,830,462 A | 5/1989 | Karny et al. | |
| 5,076,660 A | 12/1991 | Messinger | |
| 5,300,067 A | 4/1994 | Nakajima et al. | |
| 5,827,267 A | 10/1998 | Savage et al. | |
| 6,438,305 B1 | 8/2002 | Kataoka et al. | |

FOREIGN PATENT DOCUMENTS

| | | |
|---|---|---|
| DE | 42 27 803 A1 | 2/1993 |
| DE | 198 60 485 A1 | 7/1999 |
| JP | 59121007 | 7/1984 |
| JP | 60028607 | 2/1985 |
| JP | 03033808 | 2/1991 |
| WO | WO 93/16407 | 8/1993 |

*Primary Examiner* — Rhonda Peace
(74) *Attorney, Agent, or Firm* — Bacon & Thomas, PLLC

(57) ABSTRACT

A plug part for an optical waveguide (8), comprising an essentially cylindrical housing (10), at least one inlet opening (17) and at least one outlet opening (18) for a cooling medium, and a cooling collar (12) which is disposed inside the housing (10) and cools an optical waveguide (8) located in the housing (10) at least along one section (b) of the length thereof. The disclosed plug part includes a protective glass (14), across at least almost the entire internal surface of which the cooling medium flows, is provided at one end of the housing, the front of the optical waveguide (8) also being impinged upon by the cooling medium. An embodiment of a plug part for an optical waveguide (8) includes an inserted tube element (19) which divides a cooling medium flow that circulates through housing (10) into a first and a second individual flow channel (KS1, KS2).

19 Claims, 2 Drawing Sheets

AIR-COOLED PLUG PART FOR AN OPTICAL WAVEGUIDE

BACKGROUND

1. Field of the Invention

The present invention relates to an air-cooled plug part for an optical waveguide (LWL) which is particularly suited for the transmission of laser radiation.

2. Related Art

In transmitting laser radiation from a beam source to a processing station, a beam energy exists which typically lies in the range from a few milliwatt to several kilowatt. This energy is guided along an optical waveguide which generally has a diameter from 200 to 600 μm, in exceptional cases up to approximately 1.2 mm. An optical waveguide essentially consists of a core fiber (core) and a surrounding covering (cladding) which both are made of quartz glass. The cladding is adjoined by a silicone mass, and the outermost layer is often a plastic sheathing. The beam normally runs in the core fiber; if the radiation is not situated centrally in the core, an input of energy into the cladding will occur. The warming which is due to the high transmitted energy is counteracted by a cooling which acts at least along part of the length of the optical waveguide, in particular also on plug parts.

Cooled plug parts for optical waveguides are known. One possibility is to cool the optical waveguide and the plug part with water. For this purpose, water flows around the cladding at least on a part of its length and cools it intensively; the lost heat which occurs in normal use can be removed easily by the water owing to its high heat capacity.

With the transmission of laser radiation in the kilowatt range, however, the cladding may heat up excessively in some areas; the reasons for this are known to a professional, but they are of no relevance for the present invention and will not be explained in further detail. A typical maximum operating temperature which is still tolerated by the materials lies at approximately 300° C.

In practice it has been shown to be a problem that despite a water-assisted cooling the surface temperature of an optical waveguide may rise to more than 100° C., necessarily resulting in vapor bubbles. This is generally known in laser technology with water-cooled optics. In the case of a new contact with water, the quartz glass material sustains a shock in the zone which before was surrounded by the bubble; this often being a point of origin for the total destruction of the optical waveguide. A further problem is to maintain the leak-tightness of the water circulation against the background of thermal fluctuations. With such thermal fluctuations the differing coefficients of linear expansion of the materials (common matching glass/metal) are the reason for such problems in terms of leak-tightness.

SUMMARY

These problems which are known in the transmission of laser energy have lead to the consideration of using air or some other gas as cooling medium instead of water. Air has the advantage that the phenomenon of the thermal shock described above will not occur, the considerably smaller heat capacity of air proving to be of advantage here. In comparison to a water-assisted cooling, cooling with air allows the operating temperature range of the involved optics to be much larger; it may reach as far as 300° C. to 400° C., for instance. A cooling with liquid air or liquid gases is envisaged, too. Hereby, the temperature range of the cooling medium is extended and may start at −40° C. and less, for instance. In the context of comprehensive preliminary tests it has also been shown that the removal of heat loss from the optical waveguide can also be readily accomplished with air. This is due to the circumstance that the mass to be cooled is relatively small.

DETAILED DESCRIPTION OF THE INVENTION

Figure 1:
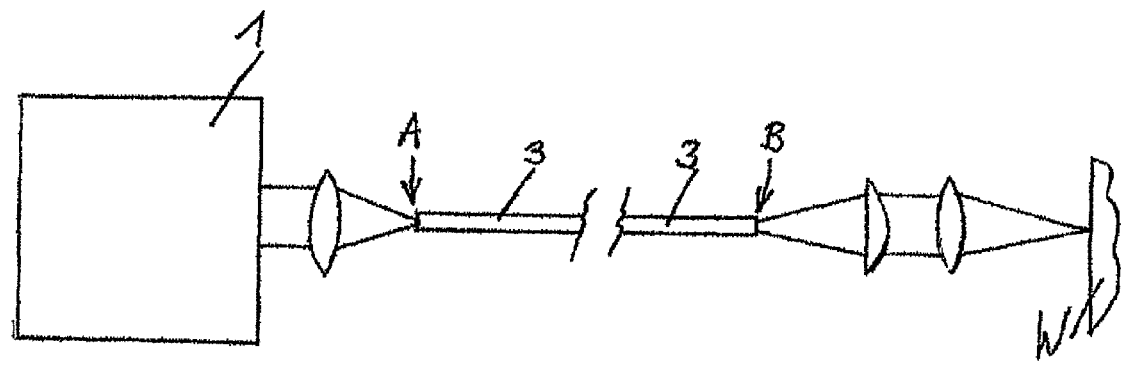
FIG. 1 schematically shows a transmission path of a laser beam from a laser to a processing station.

FIG. 1 shows in a greatly schematized form an exemplary transmission path is for a laser beam. A laser source 1 is schematically shown on the left side of FIG. 1; such source may be a YAG laser, for example, generating laser radiation in the range up to 6 kW and more. This radiation is guided via a focusing lens to an optical waveguide 3 in order to be coupled into the latter at an area designated with A. The optical waveguide has the function to guide the laser beam to a processing station along routes which often may have considerable lengths of up to 80 m; at the processing station the beam will be used for cutting, welding, marking, ablating, perforating etc. At an area B the laser beam exits the optical waveguide, runs through a collimation lens, a second focusing lens and finally arrives at the work piece W which is to be processed.

At the areas designated with A and B the plug part of the invention may be employed, although it is possible here for functional reasons or for reasons of economy to do without the plug part at area A or B.

Figure 2:
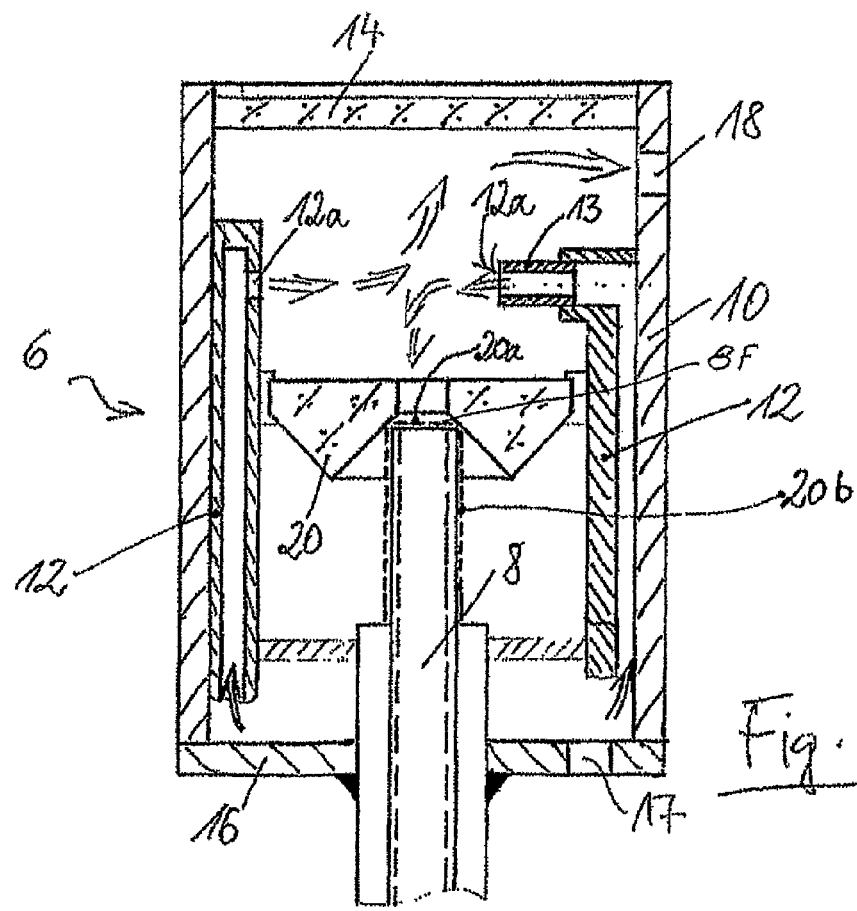
FIG. 2 shows a greatly simplified view of the air-cooled plug part according to the invention.

FIG. 2 shows a detailed view of the plug part according to the invention, which as a whole is designated with reference numeral 6. It is essentially made up of an essentially elongate cylindrical housing 10 which is closed by an end plate 16. The end plate also serves as a cable strain relief. The optical waveguide 8 enters the plug part 6 through an opening in the end plate 16. The exact construction of the optical waveguide made up of the quartz core, the quartz sheathing and the several protective casings is not essential for the invention and will therefore not be described in further detail. The only important point is that the optical waveguide is "bared" along a part of its length in the interior of the plug part, so that the exposed core appears at the front face 8F of the waveguide and the cladding at the envelope side. At the side opposite the end plate 16, a protective glass 14 is provided which is a plane-parallel plate of quartz glass with an anti-reflective coating on both sides. The beam coming from the laser runs through this plate into the plug part (area A) or leaves the plug part (area B). The protective glass 14 is further required in order to build up a pressure in the interior of the plug part and to hold off contaminants as they are found during use under industrial conditions. References numeral 17 designates an inlet bore for the cooling medium. At least one outlet bore is shown at 18, through which the supplied cooling medium (generally air) flows out again.

Optionally, the protective glass 14 is mounted to the housing 10 with seals, it being able to be replaced in case of damage. It has been shown that possible deposits appear primarily in the border area of the protective glass, while the center area which is crossed by the beam remains perfectly clean.

Furthermore, a conical prism 20 mounted on cooling collar 12 is seen in FIG. 2, which is arranged so as to be concentric to the optical waveguide and serves the purpose that the radiation can not reach the cladding. The conical prism functions as a sort of radiation blocker or gate. It may also be omitted for some applications. The active beam which is used at the processing station is in the core fiber. The conical prism 20 is only mentioned as an example for an optical element here; it would also be conceivable to use a lens, a plane-parallel plate, a differently formed prism or the like instead of the conical prism.

In addition, a cooling collar is shown at 12, which essentially is made up of a sleeve-like part having an arbitrary number of sleeve outflow openings 12*a*. These outflow openings may be realized in any form; it is possible to provide the sleeve at its inner side with a plurality of outflow tubes 13 for cooling air received from inlet 17 and which essentially are arranged radially and all "aim at" a point which is located on the longitudinal center line of the cooling collar 12. The longitudinal center line corresponds to the optical axis of the device. The outflow tubes can also be arranged in one plane, i.e. aligned so as to be perpendicular to the longitudinal center line. It is also possible to arrange them in a manner such that they point upwards or downwards with a defined angle, the tubes each being arranged with the same angle with respect to the horizontal. For manufacturing reasons the outflow tubes may also be omitted and the cooling collar may be provided with appropriate slit-like or round outflow openings in this case. This is illustrated in the left half of FIG. 2. The double arrows roughly indicate the air flow.

The cooling collar 12 is designed so as to be hollow or double-walled. The outflow tubes or outflow openings are preferably arranged so as to be rotationally symmetric, while an unsymmetrical arrangement is also envisaged.

The cooling air supplied to the cooling collar can be cleaned with modern, standard air processing units to a sufficiently high grade. The cooling air must not transport any solid particles nor any water or oil droplets, of course. The use of the process gas (which is generally highly pure in most cases) which is used as a medium at the processing station during cutting, welding etc., appears to be particularly advantageous. It is also possible to use gases such as xenon, for instance, which have a higher specific weight and a correspondingly higher heat removal capacity.

The cooling device of the present invention has proven to be extremely effective, not only in terms of heat removal. A strong cleaning effect by the circulating cooling air could also be observed, i.e. particles which eventually adhere to the exposed front face of the optical waveguide could be removed, as well as any dirt particles on the protective glass 14. This is a self-cleaning effect and is favorable for the case that, for instance during assembly, contaminants have found the way into the interior of the plug part.

The fact that the protective glass and the front face of the optical waveguide stay very clean in operation, is to be attributed to the special flow conditions in the interior of the plug part. The inventor assumes that the air jets coming out of the outflow openings 12*a* converge in the middle and bring about a highly turbulent flow, with an obvious presence of a strong flow tendency towards the front face of the optical waveguide and the middle of the protective glass. It would also be conceivable to aim outflow openings directly at the front face of the optical waveguide in order to further enhance the flow against the latter. It would likewise be possible to provide for a stronger flow against the protective glass by a suitable orientation of the outflow tubes. Furthermore, part of the outflow tubes could be orientated such that they aim at the middle of the protective glass, while the other outflow tubes preferably are directed to the front face of the optical waveguide.

An anti-reflective layer (AR layer) 20*a* may be provided on the front face 8F of the optical waveguide, such a layer improving the efficiency of beam transmission. When so coated, the content front face of the optical waveguide constitutes the "exposed" face of the waveguide. Further an AR layer 20*b* is provided which takes care that any residual perturbing radiation (which has remained in the cladding due to total reflection) can leave the cladding; this will avoid a further warming of the plastics (silicone) being provided between the cladding and its protective envelope. This irradiated perturbing radiation will be dissipated by the cooling medium.

These layers 20*a* and 20*b* are basically very delicate and have a prolonged service life through an improved cooling. It has been shown in tests that these AR layers are better protected against overheating by the air flow conditions in the interior of the plug part. It is also of advantage that the air is very dry after conditioning, so that the AR layers will not alter by humidity absorption.

Due to the fact that a certain overpressure prevails in the plug part, it can be employed in very harsh, contaminated (oil, dust, soot, combustion particles) industrial environments. through the housing inlet opening 17. A part KS1 of the cooling medium flow travels through the opening 19*a* into the flow channel between the cladding and the tube element inner wall, whereby the cladding is contacted by the cooling medium across the "bared" part The other part KS2 of the cooling flow flows through the annular space, which is formed between the housing 10 and the outer wall of tube element 19, toward the end of the optical waveguide (in the Figure towards the left). Part of KS1 of the cooling flow flows around the zone of the conical prism and produces a turbulent air flow, which has been explained above, within collar 21. After having flown around the conical prism, the cooling flow KS1 escapes outside the collar at 19*b* and will be unified with the flow KS2. The cooling flows KS1, KS2 exit the plug part through the outlet bores 18.

Figure 3:
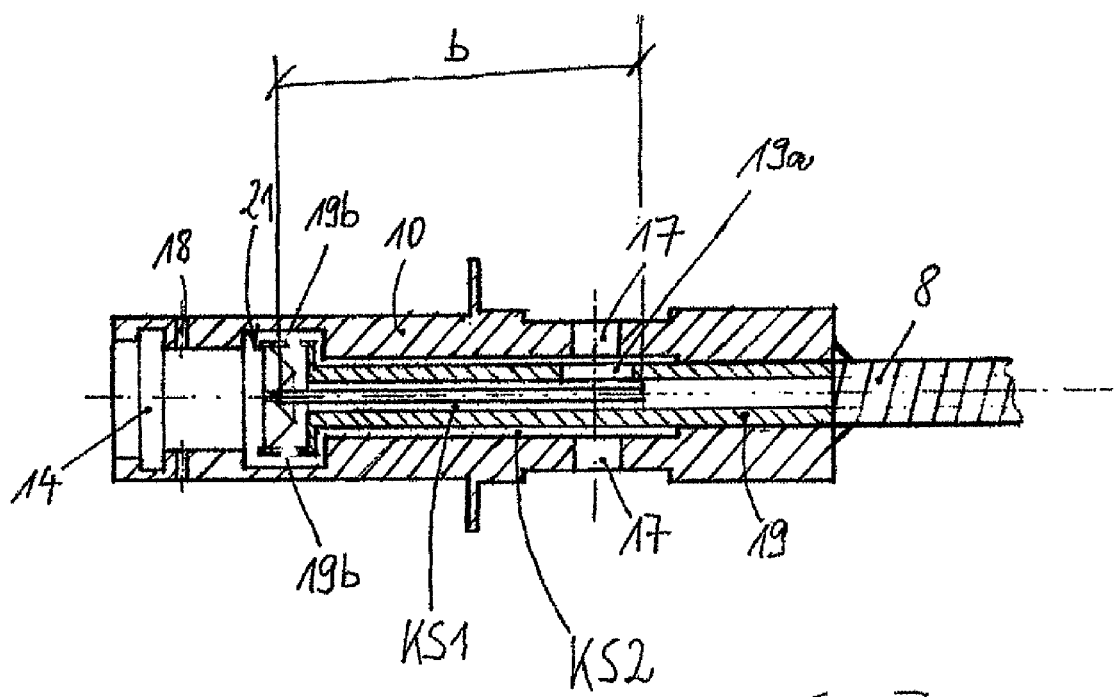
FIG. 3 is a detailed view of the plug part in a modified embodiment according to the invention, from which the flow paths of the cooling medium can be seen.

FIG. 3 shows another embodiment of a plug part according to the invention. The optical waveguide can be seen, being "bared" in region b. This Figure shows clearly that the cooling flow of the cooling medium is divided: To this end, a cooling tube element 19 connected to and forming an extension of cooling collar portion 21 is placed in the plug part and has at least a first tube opening 19*a* and second tube openings 19*b*. The cooling flow enters through the housing inlet opening 17. A part KS1 of the cooling medium flow travels through the opening 19*a* into the flow channel between the cladding and the tube element inner wall, whereby the cladding is contacted by the cooling medium across the "bared" part The other part KS2 of the cooling flow flows through the annular space, which is formed between the housing 10 and the outer wall of tube element 19, toward the end of the optical waveguide (in the Figure towards the left). Part of KS1 of the cooling flow flows around the zone of the conical prism and produces a turbulent air flow, which has been explained above, within collar 21. After having flown around the conical prism, the cooling flow KS1 escapes outside the collar at 19*b* and will be unified with the flow KS2. The cooling flows KS1, KS2 exit the plug part through the outlet bores 18.

The present invention can advantageously also be used in so-called fiber lasers in which the laser beam is directly produced in a waveguide fiber. The merits of the invention will become particularly evident here because fiber lasers reach a high temperature in operation and the thermal problems which have initially been mentioned exist with water-cooled plug parts to an even larger extent.

The invention claimed is:

1. A plug part for an optical waveguide, comprising:
   a housing having a longitudinally extending outer side wall and enclosing a length of optical waveguide terminating at an exposed front face within the housing; said housing having cooling medium inlet and outlet openings longitudinally spaced along the housing enabling circulation of a gas cooling medium in the housing between the inlet and outlet openings;
   a cooling collar comprising a tubular sleeve extending inside and along a portion of the side wall of the housing adjacent to and at least along a length of the optical waveguide including the front face thereof;
   a protective glass closing and secured to an end of the housing side wall opposite said end, the protective glass having an inner surface facing towards the front face of the optical waveguide and arranged so as to be at least partially exposed to a cooling medium circulating in the housing between said inlet and outlet openings; said front face of the optical waveguide also located and arranged so as to be exposed to a circulating cooling medium in the housing between said inlet and outlet openings, and
   sleeve outflow openings in the sleeve and arranged so as to provide cooling medium flow communication between outer and inner sides of said sleeve;
   said sleeve and sleeve outflow openings configured so as to direct cooling medium circulating between said inlet and outlet openings of the housing from the outer side of the sleeve towards a common point on a longitudinal center line of the sleeve.

2. The plug part according to claim 1, wherein the sleeve outflow openings are configured as orifices or tubes.

3. The plug part according to claim 1, wherein the sleeve outflow openings are arranged so as to direct a flow of circulating cooling medium towards the front face of the optical waveguide.

4. The plug part according to claim 1, including a cooling gas medium circulated in the housing between said inlet and outlet openings, wherein the cooling gas medium comprises one or more gases selected from the group consisting of air, $O_2$, $N_2$, Ar, $CO_2$, He, Xe, and a shielding gas used with an application using light transmitted through the optical waveguide.

5. A plug part for an optical waveguide according to claim 1, including a cooling tube element in the housing extending longitudinally along the housing length between said inlet and outlet openings, and defining first and second cooling medium flow channels extending respectively to the inner and outer sides of said collar.

6. The plug part according to claim 5, wherein the first flow channel extends along a first space between a bared section of the optical waveguide and an inner wall of the cooling tube element, and the second flow channel extends along a second space between an outer wall of the cooling tube element and an inner wall of the housing, said first flow channel being in communication with an inner area within the cooling collar that includes the front face of the waveguide element.

7. The plug part according to claim 6, wherein the cooling tube element includes a cooling tube element opening which provides fluid communication between the first and second flow channels.

8. The plug part according to claim 6, wherein said second flow channel is configured so as to direct cooling medium circulating there through to an inner surface of said protective glass.

9. The plug part according to claim 6, including a conical prism located in the interior of the housing adjacent the front face of the optical waveguide; said prism located and arranged so as to be exposed to circulating cooling medium within the cooling collar along surfaces of the prism.

10. The plug part according to claim 5, said cooling tube element connected to and forming an extension of said cooling collar extending towards an end of the housing receiving the optical waveguide.

11. The plug part according to claim 1, wherein the sleeve outflow openings are arranged so as to direct a flow of circulating cooling medium towards an inner side of the protective glass.

12. The plug part according to claim 1, including an anti-reflective layer on the front face of the optical waveguide.

13. A plug part for an optical waveguide, comprising:
    a housing having a longitudinally extending outer side wall and enclosing a length of optical waveguide terminating at an exposed front face within the housing, said housing having cooling medium inlet and outlet openings longitudinally spaced along the housing enabling circulation of a gas cooling medium in the housing between the inlet and outlet openings;
    a cooling collar extending inside and along a portion of the side wall of the housing adjacent to and at least along a length of the optical waveguide including the front face thereof;
    a protective glass closing and secured to an end of the housing side wall opposite said end, the protective glass having an inner surface facing towards the front face of the optical waveguide and arranged so as to be at least partially exposed to a cooling medium circulating in the housing between said inlet and outlet openings,
    said front face of the optical waveguide also located and arranged so as to be exposed to a circulating cooling medium in the housing between said inlet and outlet openings,
    wherein the optical waveguide is bared at least along a part of its length in the interior of the housing, leaving the exposed front face of the optical waveguide freely accessible.

14. The plug part according to claim 13, including an anti-reflective layer on the front face of the optical waveguide.

15. The plug part according to claim 13, including a cooling tube element in the housing extending longitudinally along the housing length between said inlet and outlet openings, and defining first and second cooling medium flow channels extending respectively to the inner and outer sides of said collar.

16. The plug part for an optical waveguide according to claim 13, including a cooling tube element in the housing extending longitudinally along the housing length between said inlet and outlet openings, and defining first and second cooling medium flow channels extending respectively to the inner and outer sides of said collar.

17. A plug part for an optical waveguide, comprising:
    a housing having a longitudinally extending outer side wall and enclosing a length of optical waveguide terminating at an exposed front face within the housing, said housing having cooling medium inlet and outlet openings longitudinally spaced along the housing enabling circulation of a gas cooling medium in the housing between the inlet and outlet openings;

a cooling collar extending inside and along a portion of the side wall of the housing adjacent to and at least along a length of the optical waveguide including the front face thereof;

a protective glass closing and secured to an end of the housing side wall opposite said end, the protective glass having an inner surface facing towards the front face of the optical waveguide and arranged so as to be at least partially exposed to a cooling medium circulating in the housing between said inlet and outlet openings, said front face of the optical waveguide also located and arranged so as to be exposed to a circulating cooling medium in the housing between said inlet and outlet openings, including a conical prism located in the interior of the housing adjacent the front face of the optical waveguide, said prism located and arranged so as to be exposed to circulating cooling medium within the cooling collar along surfaces of the prism.

18. The plug part according to claim 17, including an anti-reflective layer on the front face of the optical waveguide.

19. The plug part according to claim 17, including a mounting for the conical prism located on the collar.

* * * * *